US012341291B2

(12) United States Patent
Liao

(10) Patent No.: US 12,341,291 B2
(45) Date of Patent: Jun. 24, 2025

(54) CONNECTION STRUCTURE AND CONVERSION APPARATUS

(71) Applicant: Qianhai Junda (Shenzhen) Equity Investment Co., Ltd., Shenzhen (CN)

(72) Inventor: Zhuowen Liao, Shenzhen (CN)

(73) Assignee: QIANHAI JUNDA (SHENZHEN) EQUITY INVESTMENT CO., LTD., Shenzhen (CN)

( * ) Notice: Subject to any disclaimer, the term of this patent is extended or adjusted under 35 U.S.C. 154(b) by 393 days.

(21) Appl. No.: 17/950,687

(22) Filed: Sep. 22, 2022

(65) Prior Publication Data

US 2023/0307869 A1 Sep. 28, 2023

Related U.S. Application Data

(63) Continuation of application No. PCT/CN2022/078035, filed on Feb. 25, 2022.

(51) Int. Cl.

| | |
|---|---|
| ***H01R 13/627*** | (2006.01) |
| ***H01R 13/50*** | (2006.01) |
| ***H01R 13/631*** | (2006.01) |
| ***H01R 27/00*** | (2006.01) |
| ***H01R 31/06*** | (2006.01) |
| *H01R 103/00* | (2006.01) |

(52) U.S. Cl.

CPC ......... *H01R 13/6272* (2013.01); *H01R 13/50* (2013.01); *H01R 13/631* (2013.01); *H01R 27/00* (2013.01); *H01R 31/06* (2013.01); *H01R 2103/00* (2013.01)

(58) Field of Classification Search

CPC .......................... H01R 13/6272; H01R 13/44; H01R 13/4538; H01R 13/50; H01R 13/631; H01R 27/00; H01R 31/06; H01R 2103/00

See application file for complete search history.

(56) References Cited

U.S. PATENT DOCUMENTS 6,638,113 B2 * 10/2003 Kajiwara ............. H01R 31/065 439/651
7,794,251 B2 * 9/2010 Wen ....................... H01R 27/00 439/171
8,215,974 B2 * 7/2012 Lau ........................ H01R 31/06 439/528
8,251,718 B2 * 8/2012 Chen ...................... H01R 31/06 439/131

(Continued)

*Primary Examiner* — Thanh Tam T Le

(57) ABSTRACT

The present application provides a connection structure, comprising: a first structural member and a second structural member matching the first structural member, wherein the first structural member comprises a base plate and plugging blocks connected to the base plate, two plugging blocks being provided at an interval; the second structural member is provided with plugging slots, one end of the plugging slot having an opening, and the other end of the plugging slot being provided with a blocking wall; two plugging slots are provided at an interval, and the two plugging blocks are respectively slidably plugged in the two plugging slots towards the two blocking walls; and the connection structure further comprises a limiting mechanism, and the limiting mechanism is capable of restraining the two plugging blocks from being separated from the two plugging slots, respectively in a direction away from the blocking walls.

11 Claims, 7 Drawing Sheets

(56) References Cited

U.S. PATENT DOCUMENTS

| | | | | |
|---|---|---|---|---|
| 8,585,444 | B2 * | 11/2013 | Chang | H01R 13/627<br>439/651 |
| 8,790,124 | B2 * | 7/2014 | Lee | H01R 31/06<br>439/131 |
| 8,888,513 | B2 * | 11/2014 | Shi | H01R 13/44<br>439/131 |
| 9,543,704 | B1 * | 1/2017 | Hsu | H01R 13/645 |
| 10,297,965 | B1 * | 5/2019 | Yang | H01R 31/06 |
| 10,601,194 | B1 * | 3/2020 | Chien | H01R 24/78 |
| 10,797,425 | B1 * | 10/2020 | Young | H01R 13/35 |
| 10,996,695 | B2 * | 5/2021 | Chien | H01R 13/6675 |
| 11,223,171 | B2 * | 1/2022 | Zhang | H01R 27/00 |
| 11,757,241 | B2 * | 9/2023 | Liao | H01R 31/065<br>439/76.1 |
| 12,080,976 | B2 * | 9/2024 | Lee | H01R 24/68 |

* cited by examiner

CONNECTION STRUCTURE AND CONVERSION APPARATUS

CROSS-REFERENCE TO RELATED APPLICATIONS

This application claims the benefit under 35 U.S.C. § 365 (c) and § 120 and is a continuation of International Patent Application Number PCT/CN2022/078035 filed Feb. 25, 2022, and titled CONNECTION STRUCTURE AND CONVERSION APPARATUS. The entire content of this application is incorporated herein by reference in its entirety.

TECHNICAL FIELD

The present application belongs to the field of plug technology devices, and particularly relates to a connection structure and a conversion apparatus.

BACKGROUND

With the development of economy and the improvement of people's living standards, increasingly more people travel, take vacations or work abroad frequently. During a business trip or travel, people carry electronic devices such as mobile phones, computers and cameras with them. To keep these electronic devices in normal use, the electronic devices must be charged.

Insertion holes of sockets in many countries are different. For example, insertion hole structures of a Chinese standard socket, an American standard socket, a European standard socket, etc. are different, so that electrical appliances produced in one country or region do not meet a power socket standard in another country or region, making commonly used plugs fail to be switched between countries for use.

At present, use of different plugs and sockets is implemented generally by using a conversion apparatus. The conversion apparatus comprises a plug and a power adapter, and the plug is slidably plugged in the power adapter. However, the plug and the power adapter that are plugged together are prone to reverse disengagement in a sliding direction, resulting in loose electrical connection between the plug and the power adapter.

SUMMARY

An objective of an embodiment of the present application is to provide a connection structure, aiming at solving the problem of how to improve the reliability of connection between a plug and a power adapter.

To achieve the foregoing objective, the technical solution used in the present application is as follows:

According to a first aspect, a connection structure is provided, comprising: a first structural member and a second structural member matching the first structural member, wherein the first structural member comprises a base plate and plugging blocks connected to the base plate, two plugging blocks being provided at an interval; the second structural member is provided with plugging slots, one end of the plugging slot having an opening, and the other end of the plugging slot being provided with a blocking wall; two plugging slots are provided at an interval, and the two plugging blocks are respectively slidably plugged in the two plugging slots towards the two blocking walls; and the connection structure further comprises a limiting mechanism, and the limiting mechanism is capable of restraining the two plugging blocks from being separated from the two plugging slots, respectively in a direction away from the blocking walls.

In some embodiments, the limiting mechanism comprises an elastic arm connected to the base plate, having an elastic restoring force and located between the two plugging blocks; a first engagement portion connected to the elastic arm; and a second engagement portion in snap fit with the first engagement portion and located on the second structural member, wherein the base plate is provided with an avoidance groove at the position corresponding to the elastic arm.

In some embodiments, the first engagement portion is a first snap block arranged on the elastic arm in a protruding manner, the second engagement portion is a first snap slot provided in the second structural member, and the surface of the first snap block facing away from the blocking wall is provided with a first stop wall, the first stop wall being at least partially located in the first snap slot.

In some embodiments, the surface of the first snap block facing the blocking wall is provided with a first guide surface.

In some embodiments, the first engagement portion is a second snap slot provided in the elastic arm, the second engagement portion is a second snap block arranged on the second structural member in a protruding manner, and the surface of the second snap block facing away from the blocking wall is provided with a second stop wall, the second stop wall being at least partially located in the second snap slot.

In some embodiments, the surface of the second snap block facing the blocking wall is provided with a second guide surface.

In some embodiments, the limiting mechanism further comprises a toggle piece, and the toggle piece is connected to a free end of the elastic arm.

In some embodiments, at least one of slot walls of at least one of the plugging slots is provided with a first guide slot, a path extension direction of the first guide slot is the same as a path extension direction of the plugging slot, and a first guide strip matching the first guide slot is arranged on the plugging block at the position corresponding to the first guide slot in a protruding manner.

In some embodiments, a second guide strip is arranged on at least one of slot walls of at least one of the plugging slots in a protruding manner, a length direction of the second guide strip is the same as a path extension direction of the plugging slot, and the plugging block is provided with a second guide slot matching the second guide strip at the position corresponding to the second guide strip.

According to a second aspect, a conversion apparatus is provided, comprising a connection structure as described above, wherein the conversion apparatus further comprises a plug and a power adapter capable of being electrically connected to the plug, the base plate is connected to the plug, and the second structural member is connected to the power adapter.

In some embodiments, the plug is a Chinese standard plug, an American standard plug, a European standard plug, an Australian standard plug, a Korean standard plug or a British standard plug.

In some embodiments, the second structural member comprises a side plate and a cover plate, and the plugging slots are provided in the cover plate and extend to the side plate.

In some embodiments, the power adapter comprises electric pins electrically connected to the plug, the electric pins are rotatably arranged in the plugging slots, and the plugging block is provided with an accommodating hole for accommodating the electric pin.

The connection structure provided in the present application has the following beneficial effects: a first structural member is provided with two plugging blocks at an interval, a second structural member is provided with two plugging slots at an interval, the two plugging blocks are respectively slidably plugged in the two plugging slots, blocking walls restrict movement of the two plugging blocks in a plugging direction, and a limiting mechanism restrains, in a direction away from the blocking walls, the plugging blocks from sliding out of the corresponding plugging slots, so that the first structural member and the second structural member are not easily loosened, thereby improving the reliability of connection between the first structural member and the second structural member, and thus improving the reliability of connection between a plug and a power adapter.

BRIEF DESCRIPTION OF DRAWINGS

To explain the technical solutions in the embodiments of the present application more clearly, the drawings used in description of the embodiments or exemplary technologies will be briefly introduced below. Obviously, the drawings described below show only some embodiments of the present application, and for a person of ordinary skill in the art, other drawings can be further obtained based on these drawings without involving any inventive effort.

Figure 1:
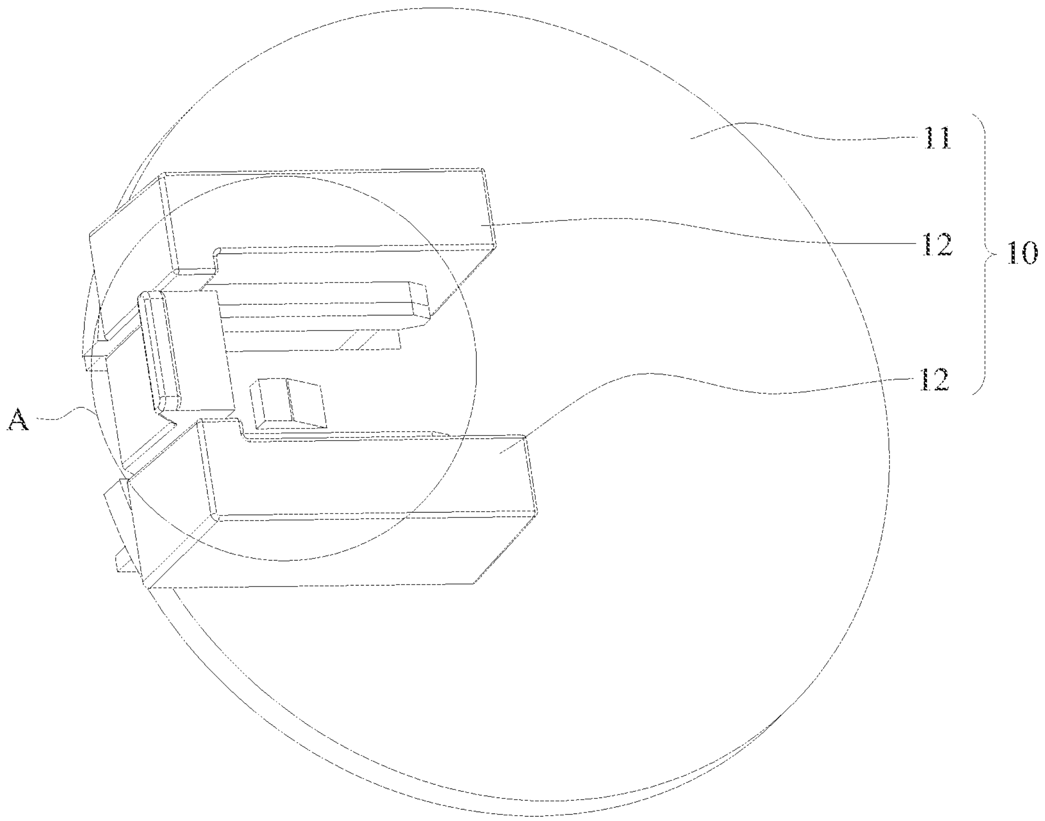
FIG. 1 is a schematic perspective structural view of a first structural member provided according to an embodiment of the present application.

Reference numerals in the drawings are as follows:

10. First structural member; 11. Base plate; 12. Plugging block; 111. Avoidance groove; 30. Limiting mechanism; 31. Toggle piece; 32. Elastic arm; 33. First snap block; 331. Stop wall; 332. First guide surface; 13. First guide strip; 211. Plugging slot; 212. Blocking wall; 213. Electric pin; 214. First guide slot; 20. Second structural member; 21. Cover plate; 22. Side plate; 100. Conversion apparatus; 101. Plug; 102. Power adapter; 34. First snap slot; 124. Accommodating hole.

DETAILED DESCRIPTION OF EMBODIMENTS

The present application is described in further detail below with reference to the drawings and embodiments to explain the objectives, technical solutions, and advantages of the present application. It should be understood that the specific embodiments described herein are merely used to explain the present application and are not intended to limit the present application.

It should be noted that when a component is referred to as being "fixed to" or "arranged at" another component, the component may be directly located on the another component or indirectly located on the another component. When a component is referred to as being "connected to" another component, the component may be directly or indirectly connected to the another component. The orientations or positional relationships indicated by the terms such as "upper", "lower", "left", and "right" are based on the orientations or positional relationships shown in the drawings, and are only for convenience of description, rather than indicating or implying that the apparatus or element referred to must have a specific orientation or be constructed and operated in a specific orientation, and therefore cannot be construed as limiting the present application. For a person of ordinary skill in the art, the specific meanings of the foregoing terms can be understood based on specific situations. The terms "first" and "second" are used for convenience of description only, and cannot be construed as indicating or implying relative importance or implicitly indicating the number of technical features. The meaning of "a plurality of" is two or more, unless otherwise explicitly and specifically defined.

Figure 2:
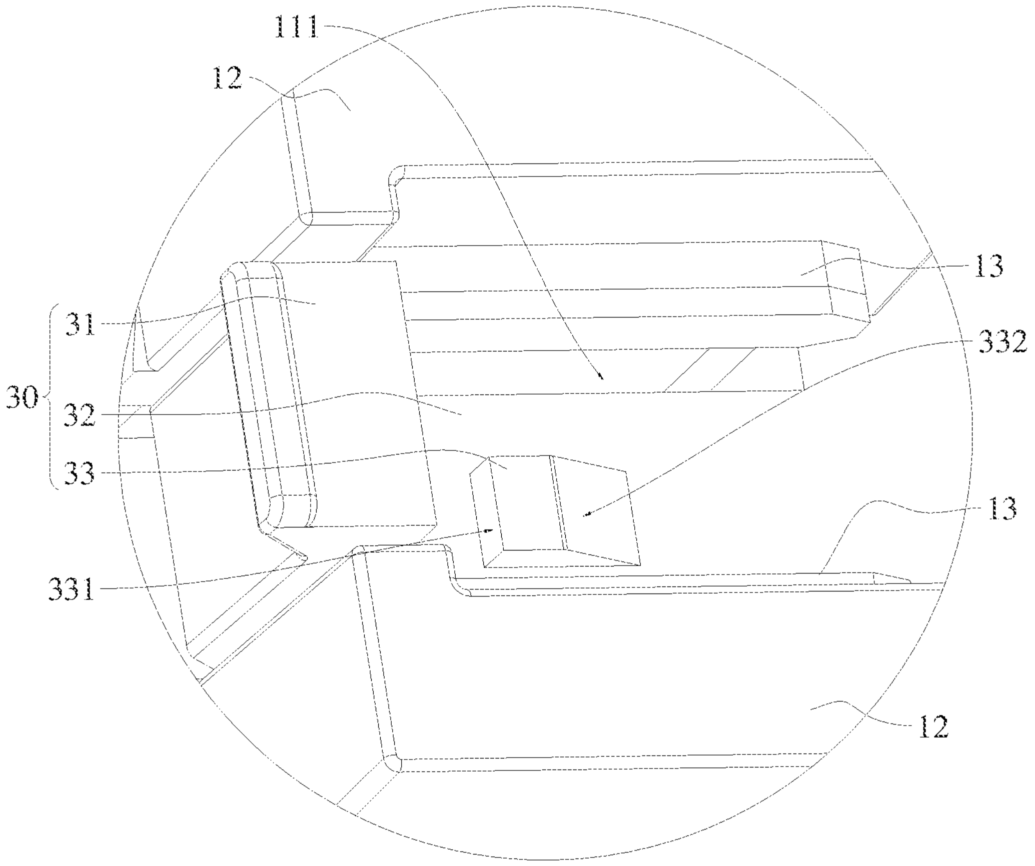
FIG. 2 is a partially enlarged view of a position A in FIG. 1.
Figure 3:
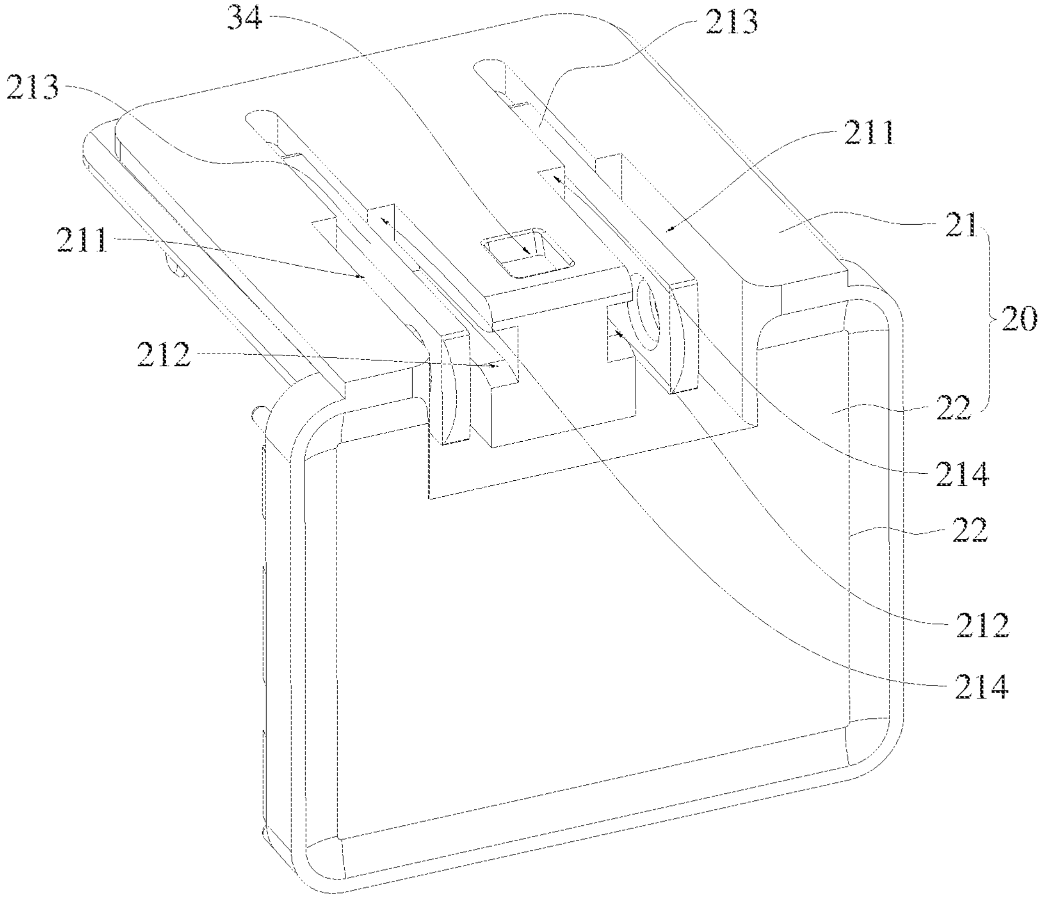
FIG. 3 is a schematic perspective structural view of a second structural member provided according to an embodiment of the present application.

Referring to FIGS. 1 to 3, an embodiment of the present application provides a connection structure configured to connect two electrical apparatus elements. Optionally, in this embodiment, the two electrical apparatus elements are a plug 101 and a power adapter 102 capable of being electrically connected to the plug 101.

The connection structure comprises: a first structural member 10 and a second structural member 20 matching the first structural member 10. Optionally, both the first structural member 10 and the second structural member 20 are made of a plastic material and are made by using an injection molding process. The plastic material is a solid material obtained by processing and molding or cross-linking and curing at a certain temperature and pressure after an additive is added with a polymer as a basic component. Because most polymers have good insulating properties, the polymers are widely used as insulating materials. Plastics fall into a thermoplastic category and a thermosetting category based on thermal behavior. It can be understood that in other embodiments, the first structural member 10 and the second structural member 20 may alternatively be made of a metal material by using a sheet metal process, which is not limited herein and can be selected based on the actual situations.

Referring to FIGS. 1 to 3, optionally, the first structural member 10 comprises a base plate 11 and plugging blocks 12 connected to the base plate 11, two plugging blocks 12 being provided at an interval. It can be understood that the two plugging blocks 12 and the base plate 11 are integrally formed by using an injection molding process. The injection molding process refers to a process of making a semi-finished product with a certain shape from a molten plastic raw material by performing operations such as pressurizing, injecting, cooling and separating.

Referring to FIGS. 1 to 3, optionally, the second structural member 20 is provided with plugging slots 211, one end of the plugging slot 211 having an opening, and the other end of the plugging slot 211 being provided with a blocking wall 212. It can be understood that one end of the plugging slot 211 in an extension direction thereof is provided with the opening, while the other end thereof is closed, and the blocking wall 212 is located on a slot wall of the plugging slot 211. Two plugging slots 211 are provided at an interval. It can be understood that the distance between the two plugging slots 211 is equal to the distance between the two plugging blocks 12. The two plugging blocks 12 are respectively slidably plugged in the two plugging slots 211 towards the two blocking walls 212. Optionally, each of the plugging blocks 12 is at least partially accommodated in the corresponding plugging slot 211, and one end of the plugging block 12 facing the blocking wall 212 abuts against the blocking wall 212, so that movement of the plugging block 12 in a plugging sliding direction is restricted by the blocking wall 212.

Referring to FIGS. 1 to 3, optionally, the connection structure further comprises a limiting mechanism 30, and the limiting mechanism 30 is configured to detachably connect the base plate 11 to the second structural member 20, and restrain the two plugging blocks 12 from being separated from the two plugging slots 211 respectively in a direction away from the blocking walls 212. It can be understood that the limiting mechanism 30 can restrain the plugging blocks 12 from reversely sliding out of the plugging slots 211 in a direction away from a plugging direction, thereby improving the reliability of connection between the first structural member 10 and the second structural member 20.

It can be understood that by connecting the first structural member 10 to the plug 101 and connecting the second structural member 20 to the power adapter 102, the reliability of connection between the plug 101 and the power adapter 102 can be improved after the first structural member 10 is plugged in the second structural member 20.

Figure 4:
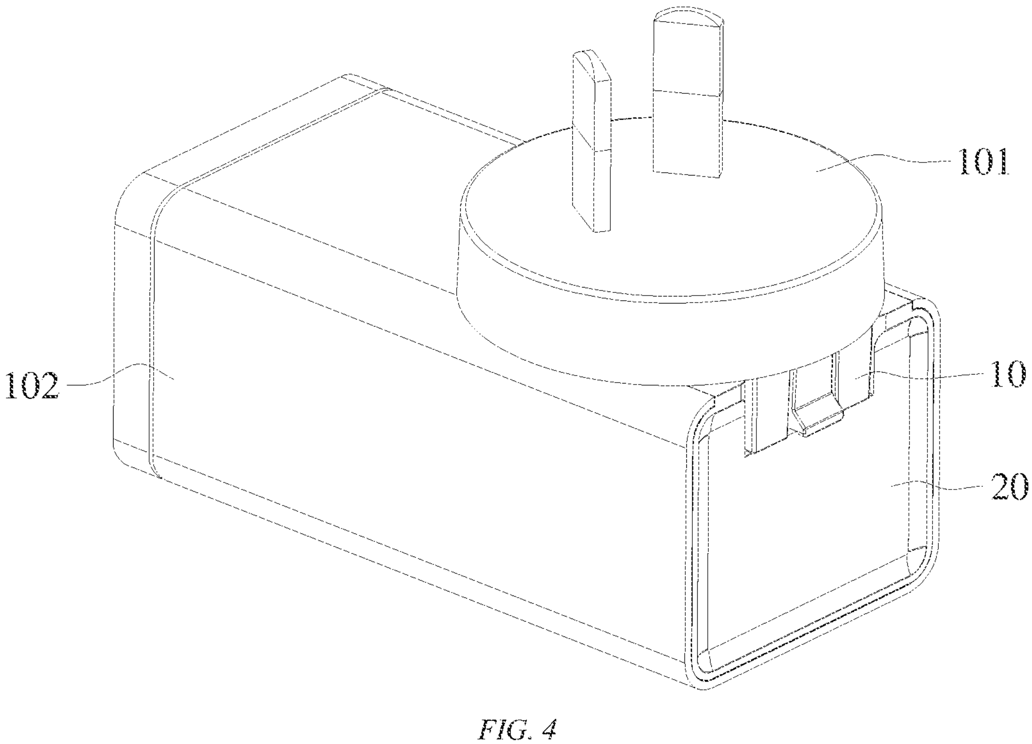
FIG. 4 is a schematic perspective structural view of a conversion apparatus provided according to an embodiment of the present application.
Figure 5:
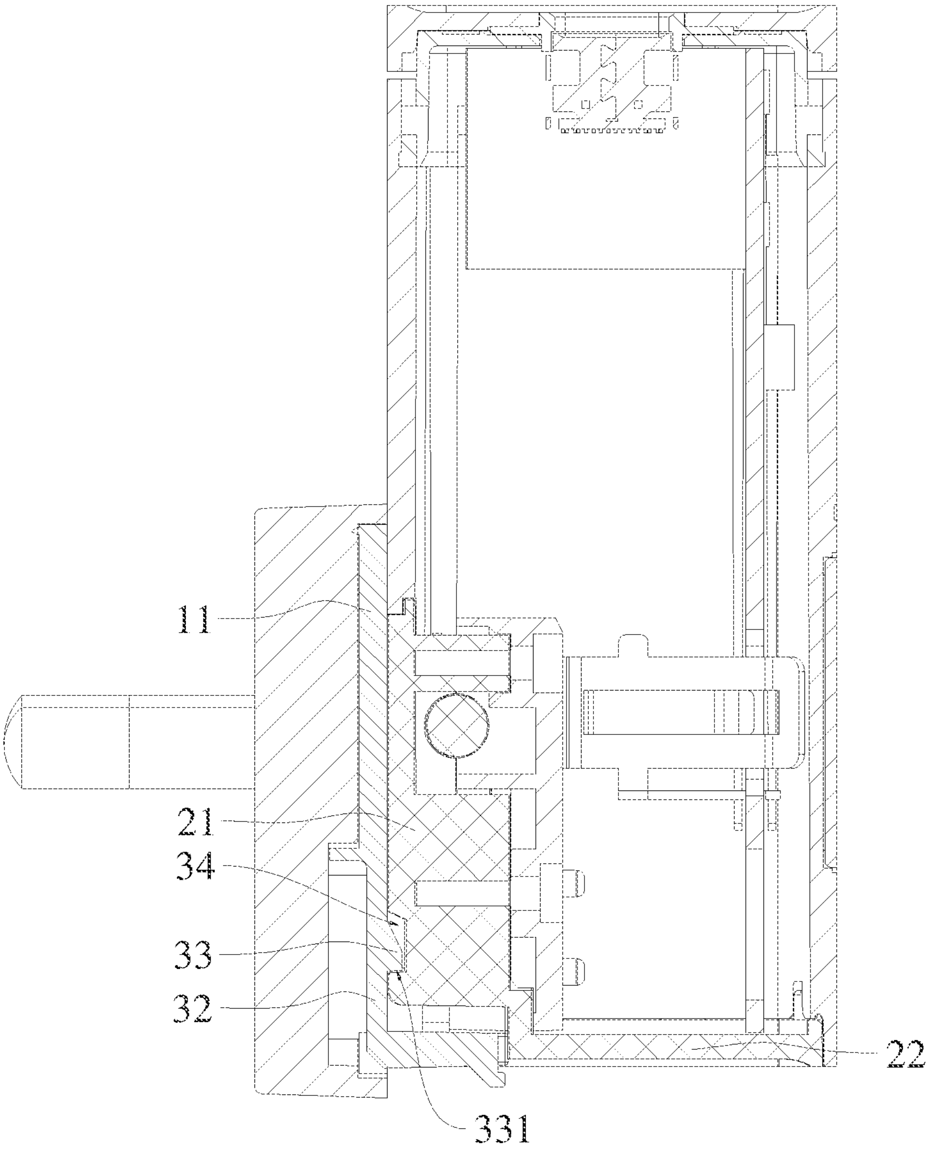
FIG. 5 is a schematic sectional view of the conversion apparatus in FIG. 4.
Figure 6:
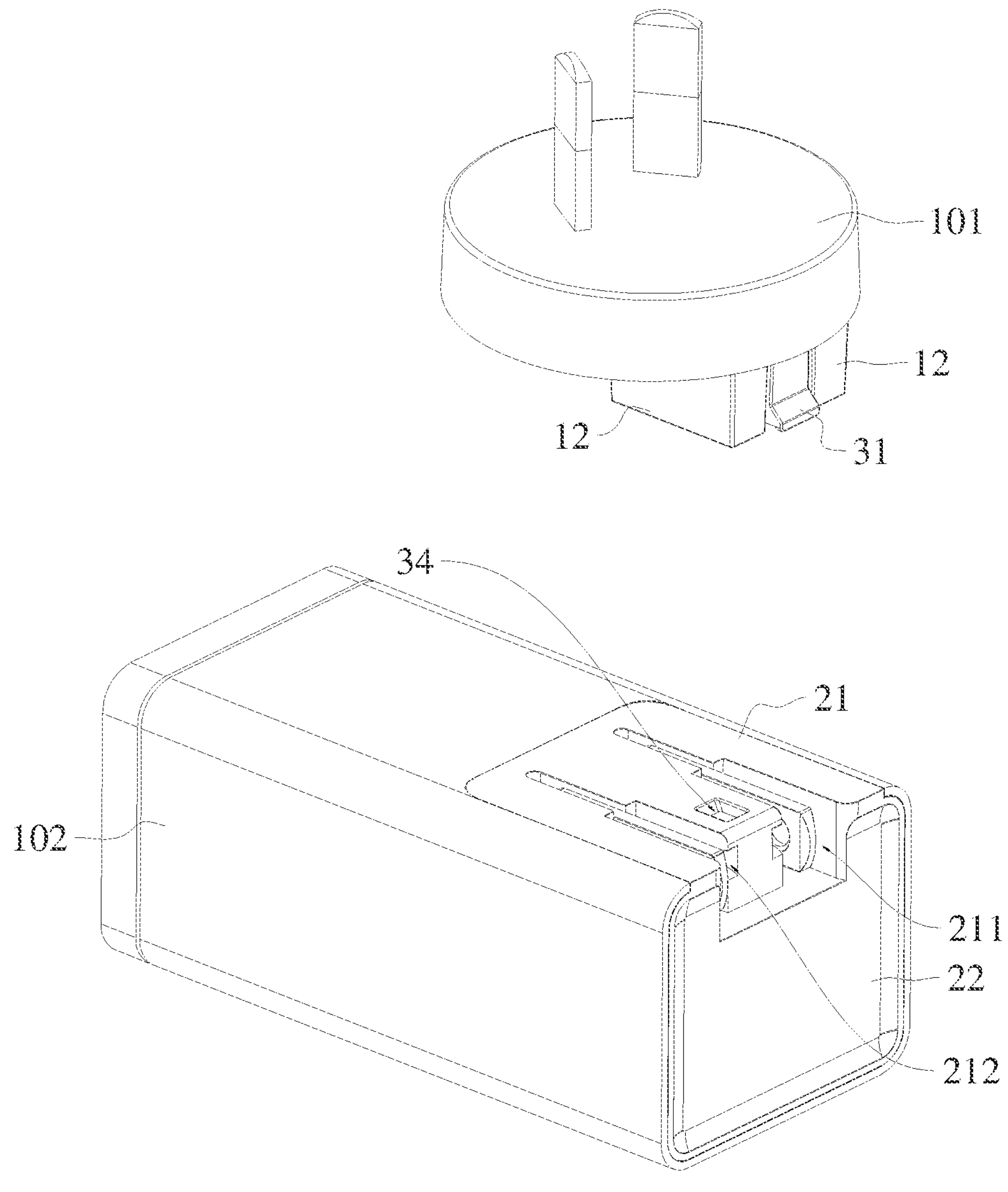
FIG. 6 is a schematic exploded view of the conversion apparatus in FIG. 4.

Referring to FIGS. 4 to 6, a first structural member 10 is provided with two plugging blocks 12 at an interval, a second structural member 20 is provided with two plugging slots 211 at an interval, the two plugging blocks 12 are respectively slidably plugged in the two plugging slots 211, blocking walls 212 restrict movement of the two plugging blocks 12 in a plugging direction, and a limiting mechanism 30 restrains, in a direction away from the blocking walls 212, the plugging blocks 12 from sliding out of the corresponding plugging slots 211, so that the first structural member 10 and the second structural member 20 are not easily loosened, thereby improving the reliability of connection between the first structural member 10 and the second structural member 20, and thus improving the reliability of connection between a plug 101 and a power adapter 102.

Referring to FIGS. 4 to 6, in some embodiments, the limiting mechanism 30 comprises an elastic arm 32 connected to the base plate 11, having an elastic restoring force and located between the two plugging blocks 12; a first engagement portion connected to the elastic arm 32; and a second engagement portion in snap fit with the first engagement portion and located on the second structural member 20, wherein the base plate 11 is provided with an avoidance groove 111 at the position corresponding to the elastic arm 32.

Referring to FIGS. 4 to 6, optionally, the elastic arm 32 is also made of a plastic material, and has certain plasticity, so that the elastic arm can be elastically deformed by a predetermined amount relative to a plate surface of the base plate 11. Optionally, the elastic arm 32 and the base plate 11 are integrally formed.

Referring to FIGS. 4 to 6, optionally, during plugging of the first structural member 10 in the second structural member 20, the elastic arm 32 is elastically deformed in a direction away from the second structural member 20, and a free end of the elastic arm 32 moves towards the inside of the avoidance groove 111. After the two plugging blocks 12 abut against the two blocking walls 212, respectively, the elastic arm 32 is reset, and the first engagement portion is engaged with the second engagement portion.

Referring to FIGS. 4 to 6, it can be understood that after the first engagement portion is engaged with the second engagement portion, the two plugging blocks 12 can be restrained from sliding out of the plugging slots 211 in a direction away from the blocking walls 212, thereby improving the reliability of connection between the first structural member 10 and the second structural member 20. Under the action of an elastic force, the elastic arm 32 presses the first engagement portion and the second engagement portion, thereby strengthening the engagement between the first engagement portion and the second engagement portion.

Referring to FIGS. 1 to 3, in some embodiments, the first engagement portion is a first snap block 33 arranged on the elastic arm 32 in a protruding manner, the second engagement portion is a first snap slot 34 provided in the second structural member 20, and the surface of the first snap block 33 facing away from the blocking wall 212 is provided with a first stop wall 331, the first stop wall 331 being at least partially located in the first snap slot 34.

Optionally, the first stop wall 331 is substantially perpendicular to the direction in which the plugging block 12 is plugged in the plugging slot 211, and the first stop wall 331 abuts against a slot wall of the first snap slot 34 in the direction away from the blocking walls 212, so that under the combined action of the first stop wall 331 and the two blocking walls 212, the plugging block 12 is restrained from being separated from the corresponding plugging slot 211 in the plugging direction, thereby improving the reliability of connection between the first structural member 10 and the second structural member 20.

Referring to FIGS. 1 to 3, in some embodiments, the surface of the first snap block 33 facing the blocking wall 212 is provided with a first guide surface 332. Optionally, the first guide surface 332 is inclined in the direction away from one of the blocking walls 212, and the first guide surface 332 can guide engagement of the first snap block 33 into the first snap slot 34, so as to improve convenience of plugging the plugging block 12 into the plugging slot 211.

Referring to FIGS. 1 to 3, it can be understood that the elastic arm 32 is driven by an external force to undergo a predetermined amount of elastic deformation in the direction away from the second structural member 20, so that the first snap block 33 is disengaged from the first snap slot 34, and then the two plugging blocks 12 are driven to slide out of the two plugging slots 211, respectively, thereby facilitating disassembly/assembly of the first structural member 10 and the second structural member 20.

Referring to FIGS. 4 to 6, in some embodiments, the first engagement portion is a second snap slot provided in the elastic arm 32, the second engagement portion is a second snap block arranged on the second structural member 20 in a protruding manner, and the surface of the second snap block facing away from the blocking wall 212 is provided with a second stop wall 331, the second stop wall 331 being at least partially located in the second snap slot.

Referring to FIGS. 1 to 3, optionally, the second stop wall 331 is substantially perpendicular to the direction in which the plugging block 12 is plugged in the plugging slot 211, and the second stop wall 331 abuts against a slot wall of the second snap slot in the direction away from one of the blocking walls 212, so that under the combined action of the second stop wall 331 and the two blocking walls 212, the plugging block 12 is restrained from being separated from the corresponding plugging slot 211 in the plugging direction, thereby improving the reliability of connection between the second structural member 20 and the second structural member 20.

Referring to FIGS. 1 to 3, it can be understood that the elastic arm 32 is driven by an external force to undergo a predetermined amount of elastic deformation in the direction away from the second structural member 20, so that the second snap block is disengaged from the second snap slot, and then the two plugging blocks 12 are driven to slide out of the two plugging slots 211, respectively, thereby facilitating disassembly/assembly of the first structural member 10 and the second structural member 20.

In some embodiments, the surface of the second snap block facing the blocking wall 212 is provided with a second guide surface.

Optionally, the second guide surface is inclined in the direction away from one of the blocking walls 212, and the second guide surface can guide engagement of the second snap block into the second snap slot, so as to improve convenience of plugging the plugging block 12 into the plugging slot 211.

In some embodiments, the limiting mechanism 30 further comprises a toggle piece 31, and the toggle piece 31 is connected to the free end of the elastic arm 32.

Referring to FIGS. 1 to 3, optionally, a length direction of the toggle piece 31 is staggered with a length direction of the elastic arm 32, and the elastic arm 32 can be driven to elastically deform in the direction away from the second structural member 20 by manipulating the toggle piece 31 by hand.

In some embodiments, at least one of slot walls of at least one of the plugging slots 211 is provided with a first guide slot 214, a path extension direction of the first guide slot 214 is the same as a path extension direction of the plugging slot 211, and a first guide strip 13 matching the first guide slot 214 is arranged on the plugging block 12 at the position corresponding to the first guide slot 214 in a protruding manner.

Referring to FIGS. 1 to 3, optionally, in this embodiment, slot walls of the two plugging slots 211 are each provided with a first guide slot 214, and a first guide strip 13 is arranged on each plugging block 12 in a protruding manner. The two first guide slots 214 are in plugging fit with the two first guide strips 13, respectively, so that the plugging blocks 12 can be restrained from being separated from the corresponding plugging slots 211 in a direction perpendicular to the plugging direction, thereby improving the reliability of connection between the first structural member 10 and the second structural member.

Referring to FIGS. 1 to 3, optionally, the two first guide strips 13 are both located between the two plugging blocks 12.

In some embodiments, a second guide strip is arranged on at least one of slot walls of at least one of the plugging slots 211 in a protruding manner, a length direction of the second guide strip is the same as a path extension direction of the plugging slot 211, and the plugging block 12 is provided with a second guide slot matching the second guide strip at the position corresponding to the second guide strip.

Referring to FIGS. 1 to 3, optionally, in this embodiment, a second guide strip is arranged on a slot wall of each of the two plugging slots 211 in a protruding manner, and each plugging block 12 is provided with a second guide slot. The two second guide slots are in plugging fit with the two second guide strips, respectively, so that the plugging blocks 12 can be restrained from being separated from the corresponding plugging slots 211 in the direction perpendicular to the plugging direction, thereby improving the reliability of connection between the second structural member 20 and the second structural member.

Referring to FIGS. 1 to 3, optionally, the two second guide slots are both located between the two plugging blocks 12.

Referring to FIGS. 4 to 6, the present application further provides a conversion apparatus 100, and the conversion apparatus 100 comprises a connection structure. For the specific structure of the connection structure, reference is made to the foregoing embodiments. As the conversion apparatus 100 uses all the technical solutions of all the foregoing embodiments, the conversion apparatus also has all the beneficial effects brought by the technical solutions of the foregoing embodiments. Details are not described again herein.

In some embodiments, the conversion apparatus 100 further comprises a plug 101 and a power adapter 102 capable of being electrically connected to the plug 101, the base plate 11 is connected to the plug 101, and the second structural member 20 is connected to the power adapter 102.

Referring to FIGS. 4 to 6, optionally, after the first structural member 10 is in plugging fit with the second structural member 20, the plug 101 is electrically connected to the power adapter 102, and by electrically plugging the plug 101 into a power socket, the power adapter 102 can be indirectly electrically connected to the power plug 101. It can be understood that the power adapter 102 can be adapted to power sockets in different countries by replacing plugs 101 having different specification standards.

Figure 7:
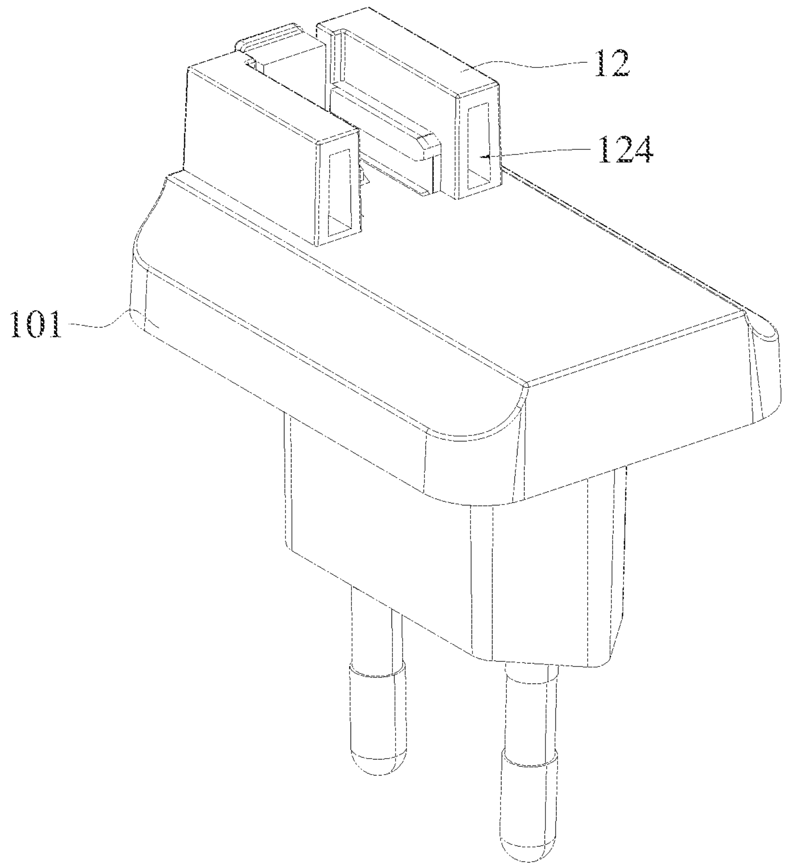
FIG. 7 is a schematic structural view of a European standard plug provided according to an embodiment of the present application.
Figure 8:
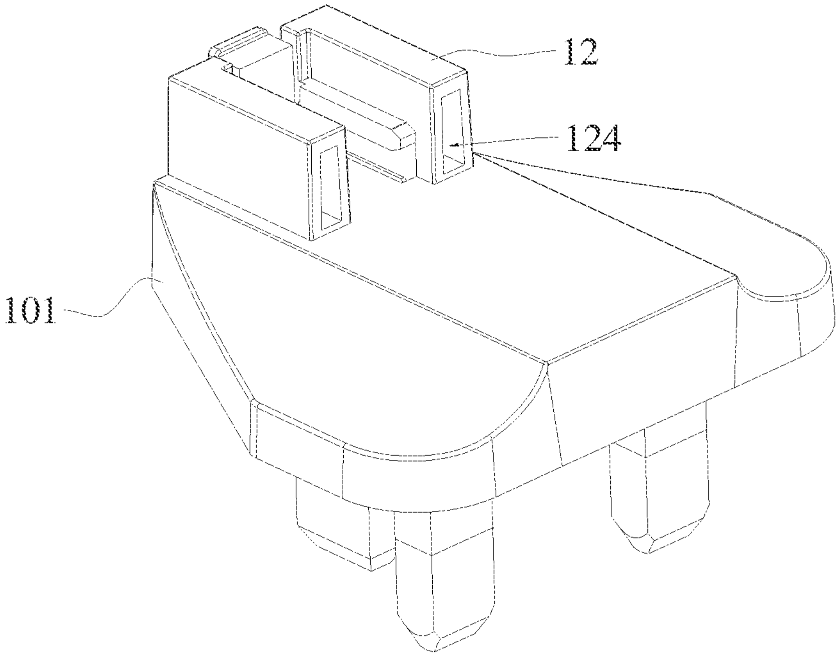
FIG. 8 is a schematic structural view of a British standard plug provided according to an embodiment of the present application.

Referring to FIGS. 7 and 8, in some embodiments, the plug 101 is a Chinese standard plug, an American standard plug, a European standard plug, an Australian standard plug or a British standard plug.

The Chinese standard plug is a plug 101 which meets the Chinese standard.

The American standard plug is a plug 101 which meets the American standard.

Referring to FIG. 7, the European standard plug is a plug 101 which meets the European standard.

Referring to FIG. 4, the Australian standard plug is a plug 101 which meets the Australian standard.

Referring to FIG. 8, the British standard plug is a plug 101 which meets the British standard.

Optionally, a Korean standard plug is a plug 101 which meets the Korean standard.

Optionally, the power adapter 102 is further provided with a plurality of USB interfaces and/or a plurality of TYPE-C interfaces.

In some embodiments, the second structural member 20 comprises a side plate 22 and a cover plate 21, and the plugging slots 211 are provided in the cover plate 21 and extend to the side plate 22.

Optionally, a plate surface of the side plate 22 is arranged perpendicular to a plate surface of the cover plate 21, and both the side plate 22 and the cover plate 21 are connected to the power adapter 102.

Referring to FIGS. 7 and 8, in some embodiments, the power adapter 102 comprises electric pins 213 electrically connected to the plug 101, the electric pins 213 are rotatably arranged in the plugging slots 211, and the plugging block 12 is provided with an accommodating hole 124 for accommodating the electric pin 213.

It can be understood that, by rotating the electric pins 213 by a predetermined angle so that each of the electric pins 213 is erected on the power adapter 102, the power adapter 102 can be independently electrically connected to a corresponding power socket, thereby improving convenience of using the conversion apparatus 100.

The foregoing is merely the optional embodiments of the present application, and is not intended to limit the present application. Various changes and variations may be made to the present application for a person skilled in the art. Any modification, equivalent replacement, improvement, and the like made within the spirit and principles of the present application should fall within the scope of protection of the present application.

What is claimed is:

1. A connection structure, comprising: a first structural member and a second structural member matching the first structural member, wherein the first structural member comprises a base plate and two plugging blocks connected to the base plate, the two plugging blocks is provided at an interval; the second structural member is provided with two plugging slots, one end of each plugging slot has an opening, and another end of the plugging slot is provided with a blocking wall; the two plugging slots are provided at an interval, and the two plugging blocks are respectively slidably plugged in the two plugging slots towards the two blocking walls; and the connection structure further comprises a limiting mechanism, and the limiting mechanism is capable of restraining the two plugging blocks from being separated from the two plugging slots, respectively in a direction away from the blocking walls;

wherein the limiting mechanism comprises an elastic arm connected to the base plate, having an elastic restoring force and located between the two plugging blocks; a first engagement portion connected to the elastic arm; and a second engagement portion in snap fit with the first engagement portion and located on the second structural member, wherein the base plate is provided with an avoidance groove at a position corresponding to the elastic arm; and wherein the limiting mechanism further comprises a toggle piece, and the toggle piece is connected to a free end of the elastic arm; a length direction of the toggle piece is staggered with a length direction of the elastic arm, and the elastic arm is capable of being driven to elastically deform in a direction away from the second structural member by manipulating the toggle piece by hand.

2. The connection structure according to claim 1, wherein the first engagement portion is a first snap block arranged on the elastic arm in a protruding manner, the second engagement portion is a first snap slot provided in the second structural member, and a surface of the first snap block facing away from the blocking wall is provided with a first stop wall, and the first stop wall is at least partially located in the first snap slot.

3. The connection structure according to claim 2, wherein a surface of the first snap block facing the blocking wall is provided with a first guide surface.

4. The connection structure according to claim 1, wherein the first engagement portion is a second snap slot provided in the elastic arm, the second engagement portion is a second snap block arranged on the second structural member in a protruding manner, and a surface of the second snap block facing away from the blocking wall is provided with a second stop wall, and the second stop wall is at least partially located in the second snap slot.

5. The connection structure according to claim 4, wherein a surface of the second snap block facing the blocking wall is provided with a second guide surface.

6. The connection structure according to claim 1, wherein at least one of slot walls of at least one of the plugging slots is provided with a first guide slot, a path extension direction of the first guide slot is the same as a path extension direction of the plugging slot, and a first guide strip matching the first guide slot is arranged on the plugging block at a position corresponding to the first guide slot in a protruding manner.

7. The connection structure according to claim 1, wherein a second guide strip is arranged on at least one of slot walls of at least one of the plugging slots in a protruding manner, a length direction of the second guide strip is the same as a path extension direction of the plugging slot, and the plugging block is provided with a second guide slot matching the second guide strip at a position corresponding to the second guide strip.

8. A conversion apparatus, comprising: a first structural member and a second structural member matching the first structural member, wherein the first structural member comprises a base plate and two plugging blocks connected to the base plate, the two plugging blocks is provided at an interval; the second structural member is provided with two plugging slots, one end of each plugging slot has an opening, and another end of the plugging slot is provided with a blocking wall; the two plugging slots are provided at an interval, and the two plugging blocks are respectively slidably plugged in the two plugging slots towards the two blocking walls; the conversion apparatus further comprises a limiting mechanism, and the limiting mechanism is capable of restraining the two plugging blocks from being separated from the two plugging slots, respectively in a direction away from the blocking walls; and the conversion apparatus further comprises a plug and a power adapter capable of being electrically connected to the plug, the base plate is connected to the plug, and the second structural member is connected to the power adapter;

wherein the limiting mechanism comprises an elastic arm connected to the base plate, having an elastic restoring force and located between the two plugging blocks; a first engagement portion connected to the elastic arm; and a second engagement portion in snap fit with the first engagement portion and located on the second structural member, wherein the base plate is provided with an avoidance groove at a position corresponding to the elastic arm; and wherein the limiting mechanism further comprises a toggle piece, and the toggle piece is connected to a free end of the elastic arm; a length direction of the toggle piece is staggered with a length direction of the elastic arm, and the elastic arm is capable of being driven to elastically deform in a direction away from the second structural member by manipulating the toggle piece by hand.

9. The conversion apparatus according to claim 8, wherein the plug is a Chinese standard plug, an American standard plug, a European standard plug, an Australian standard plug, a Korean standard plug or a British standard plug.

10. The conversion apparatus according to claim 8, wherein the second structural member comprises a side plate and a cover plate, and the plugging slots are provided in the cover plate and extend to the side plate.

11. The conversion apparatus according to claim 8, wherein the power adapter comprises electric pins electrically connected to the plug, the electric pins are rotatably arranged in the plugging slots, and the plugging block is provided with an accommodating hole for accommodating the electric pin.

* * * * *